US011577931B2

United States Patent
Ladi et al.

(10) Patent No.: US 11,577,931 B2
(45) Date of Patent: Feb. 14, 2023

(54) EFFECTING ELEVATOR SERVICE BASED ON INDOOR PROXIMITY OF MOBILE DEVICE TO ELEVATOR LOBBY

(71) Applicant: Otis Elevator Company, Farmington, CT (US)

(72) Inventors: Srinivasa Rao Ladi, Telangana (IN); Ramesh Akula, Andhra Pradesh (IN)

(73) Assignee: OTIS ELEVATOR COMPANY, Farmington, CT (US)

( * ) Notice: Subject to any disclaimer, the term of this patent is extended or adjusted under 35 U.S.C. 154(b) by 437 days.

(21) Appl. No.: 16/750,448

(22) Filed: Jan. 23, 2020

(65) Prior Publication Data
US 2020/0239275 A1    Jul. 30, 2020

(30) Foreign Application Priority Data

Jan. 28, 2019  (IN) .............................. 201911003364

(51) Int. Cl.
*B66B 1/46* (2006.01)
*H04W 4/024* (2018.01)
(Continued)

(52) U.S. Cl.
CPC ............ *B66B 1/468* (2013.01); *H04L 47/283* (2013.01); *H04W 4/023* (2013.01); *H04W 4/024* (2018.02);
(Continued)

(58) Field of Classification Search
CPC .... H04L 47/283; H04W 4/023; H04W 4/024; H04W 4/029; H04W 4/33; B66B 1/468;
(Continued)

(56) References Cited

U.S. PATENT DOCUMENTS

| 7,162,233 B2 | 1/2007 | Chiba |
| 7,552,800 B2 | 6/2009 | Puskala et al. |

(Continued)

FOREIGN PATENT DOCUMENTS

| CN | 103261068 A | 8/2013 |
| CN | 103974889 A | 8/2014 |

(Continued)

OTHER PUBLICATIONS

European Search Report; Application No. 19216563.7-1017; dated Jul. 10, 2020; 5 pages.

(Continued)

*Primary Examiner* — Chae S Lee
(74) *Attorney, Agent, or Firm* — Cantor Colburn LLP

(57) ABSTRACT

An elevator system having a controller configured for: receiving a communication from the mobile device for a passenger, the communication including first data, wherein the first data is position data obtained by the mobile device executing a multilateration (MLAT) process with one or more proximately located telecommunication devices, rendering a first determination, from the first data, that the mobile device is proximate a first distance from the lobby, rendering a second determination, from the first determination, arrive at the lobby proximate a first time, and transmitting a communication to an elevator instructing the elevator to arrive at the lobby proximate the first time to provide elevator service.

16 Claims, 4 Drawing Sheets

(51) Int. Cl.
  *H04W 4/33* (2018.01)
  *H04W 4/029* (2018.01)
  *H04L 47/283* (2022.01)
  *H04W 4/02* (2018.01)

(52) U.S. Cl.
  CPC ............ *H04W 4/029* (2018.02); *H04W 4/33* (2018.02); *B66B 2201/4615* (2013.01); *B66B 2201/4638* (2013.01); *B66B 2201/4653* (2013.01)

(58) Field of Classification Search
  CPC .... B66B 2201/4615; B66B 2201/4638; B66B 2201/4653; B66B 2201/103; B66B 2201/232; B66B 1/2408; B66B 1/28; B66B 2201/4607
  See application file for complete search history.

(56) References Cited

U.S. PATENT DOCUMENTS

| | | | |
|---|---|---|---|
| 8,061,485 | B2 | 11/2011 | Finschi |
| 8,960,373 | B2 | 2/2015 | De Vincentis |
| 9,459,337 | B2 | 10/2016 | Aldana et al. |
| 9,469,500 | B2 | 10/2016 | Friedli |
| 9,736,640 | B2 | 8/2017 | Aldana |
| 9,749,883 | B2 | 8/2017 | Van Doorselaer et al. |
| 9,878,875 | B1 | 1/2018 | Scoville et al. |
| 10,118,797 | B2 | 11/2018 | Keser |
| 2015/0133173 | A1* | 5/2015 | Edge ............ G01S 5/08 455/456.6 |
| 2015/0168154 | A1* | 6/2015 | Boerger ............ G01C 21/206 701/410 |
| 2017/0010099 | A1* | 1/2017 | Simcik ............ G01C 21/206 |
| 2017/0134894 | A1 | 5/2017 | Simcik |
| 2018/0319625 | A1* | 11/2018 | Mustonen ............ B66B 1/3438 |
| 2020/0239275 | A1 | 7/2020 | Ladi et al. |

FOREIGN PATENT DOCUMENTS

| | | |
|---|---|---|
| CN | 104837118 A | 8/2015 |
| EP | 2600165 B1 | 7/2014 |
| EP | 1525764 B1 | 7/2015 |
| EP | 3052418 A1 | 8/2016 |
| EP | 3116200 A2 | 1/2017 |
| EP | 3693309 A1 | 8/2020 |
| KR | 1020040076634 A | 9/2004 |
| WO | 2005009879 A1 | 2/2005 |
| WO | 2008116963 A1 | 10/2008 |
| WO | 2017112659 A1 | 6/2017 |

OTHER PUBLICATIONS

Office Action for Indian Application No. 201911003364 dated May 29, 2021.
Office Action for Chinese Application No. 201911415493.4 dated Nov. 26, 2021.
Chinese Office Action; dated Aug. 3, 2022; Application No. 201911415493.4; Filed: Dec. 31, 2019; 5 pages.

* cited by examiner

EFFECTING ELEVATOR SERVICE BASED ON INDOOR PROXIMITY OF MOBILE DEVICE TO ELEVATOR LOBBY

CROSS-REFERENCE TO RELATED APPLICATIONS

This application claims the benefit of Indian Application No. 201911003364 filed Jan. 28, 2019, the disclosure of which is incorporated herein by reference in its entirety.

BACKGROUND

The embodiments herein relate to elevators and more specifically to a system and method for effecting elevator service based on indoor proximity of mobile device to elevator lobby.

It may be desirable to determine whether a potential passenger is located inside a building, for example where global positioning systems (GPS) may be shielded from service, or GPS systems are otherwise inoperative or yet to be implemented. Further, an irregular shape to a building may create a challenge for tracking a person in the building.

SUMMARY

Disclosed is an elevator system having a controller configured for: receiving a communication from the mobile device for a passenger, the communication including first data, wherein the first data is position data obtained by the mobile device executing a multilateration (MLAT) process with one or more proximately located telecommunication devices, rendering a first determination, from the first data, that the mobile device is proximate a first distance from the lobby, rendering a second determination, from the first determination, arrive at the lobby proximate a first time, and transmitting a communication to an elevator instructing the elevator to arrive at the lobby proximate the first time to provide elevator service.

In addition to one or more disclosed features or as an alternate, wherein prior to receiving the communication from the mobile device, the controller is configured for: receiving a communication from the mobile device requesting elevator service at the lobby, and transmitting a communication to the mobile device requesting the mobile device to return the first data.

In addition to one or more disclosed features or as an alternate the controller is configured for transmitting a communication to the mobile device instructing the mobile device to visually and/or audibly inform the passenger that the elevator is arriving at the lobby proximate the first time to provide the first passenger with elevator service.

In addition to one or more disclosed features or as an alternate the mobile device executes the MLAT process by executing Wi-Fi RTT (Round-Trip-Time) protocols with the one or more proximately located telecommunication devices.

In addition to one or more disclosed features or as an alternate the one or more proximately located telecommunication devices are one or more Wi-Fi access points.

In addition to one or more disclosed features or as an alternate the one or more Wi-Fi access points are at least three Wi-Fi access points.

In addition to one or more disclosed features or as an alternate the at least three Wi-Fi access points are located within the building.

In addition to one or more disclosed features or as an alternate the at least three Wi-Fi access points communicate over a common Wi-Fi network.

In addition to one or more disclosed features or as an alternate the controller communicates with the mobile device over a personal area network (PAN).

In addition to one or more disclosed features or as an alternate the system includes at least one beacon for communicating with the mobile over the PAN.

In addition to one or more disclosed features or as an alternate the controller communicates with the elevator over a Controller Area Network (CAN).

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
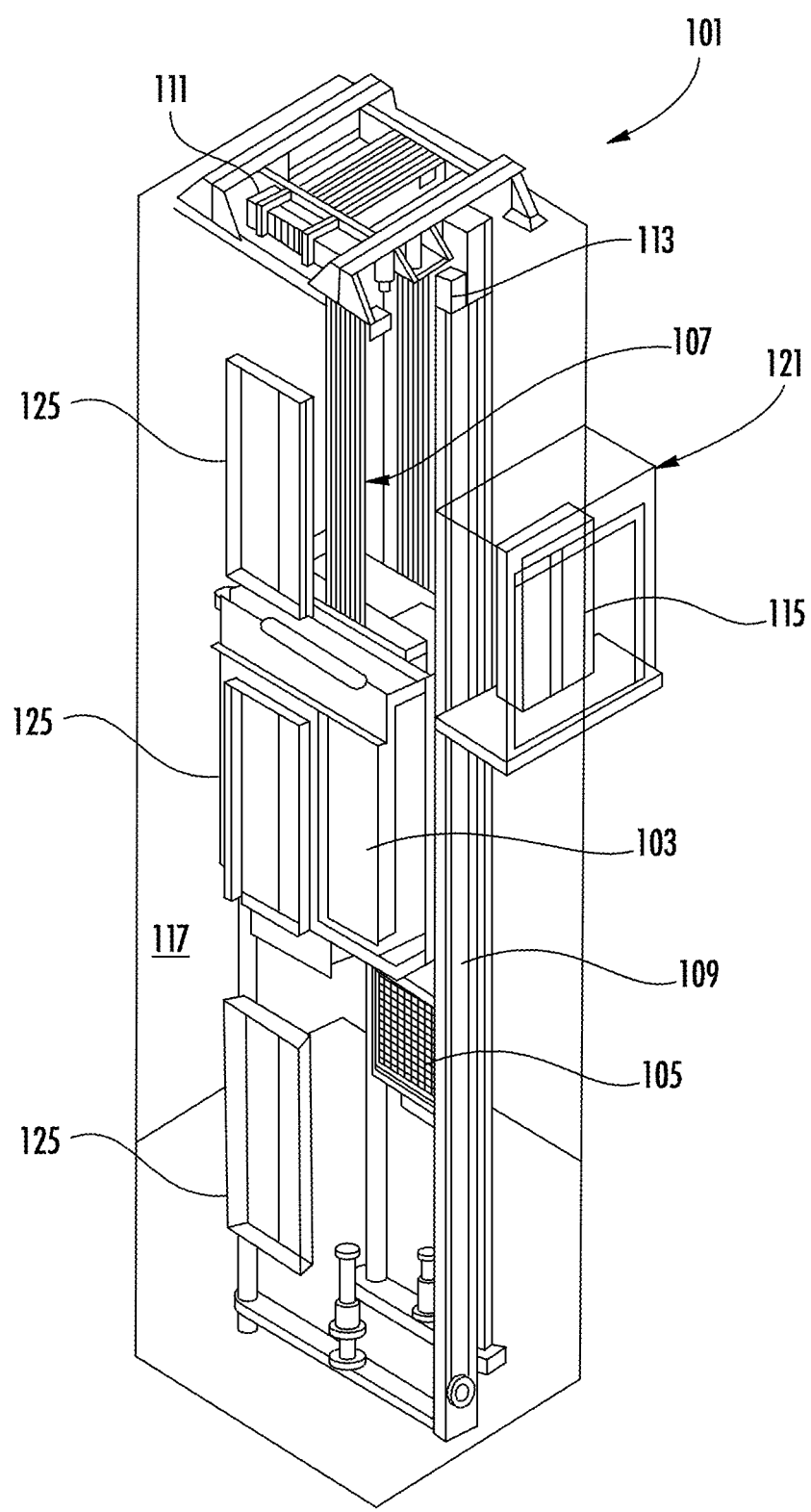
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator hoistway 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator hoistway 117, such as on a support or guide rail, and may be configured to provide position signals related to a position of the elevator car 103 within the elevator hoistway 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator hoistway 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator hoistway 117 along guide rail 109, the elevator car 103 may stop at one or more lobbies 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator hoistway 117.

Although shown and described with a roping system including tension member 107, elevator systems that employ other methods and mechanisms of moving an elevator car within an elevator hoistway may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

The following figures illustrate additional technical features associated with one or more disclosed embodiments. Features disclosed in the following figures having nomenclature similar to features disclosed in FIG. 1 may be similarly construed though being positively reintroduced with numerical identifiers that may differ from those in FIG. 1. Further, process steps disclosed hereinafter may be sequentially numbered to facilitate discussion of one or more disclosed embodiments. Such numbering is not intended to identify a specific sequence of performing such steps or a specific requirement to perform such steps unless expressly indicated.

Figure 2:
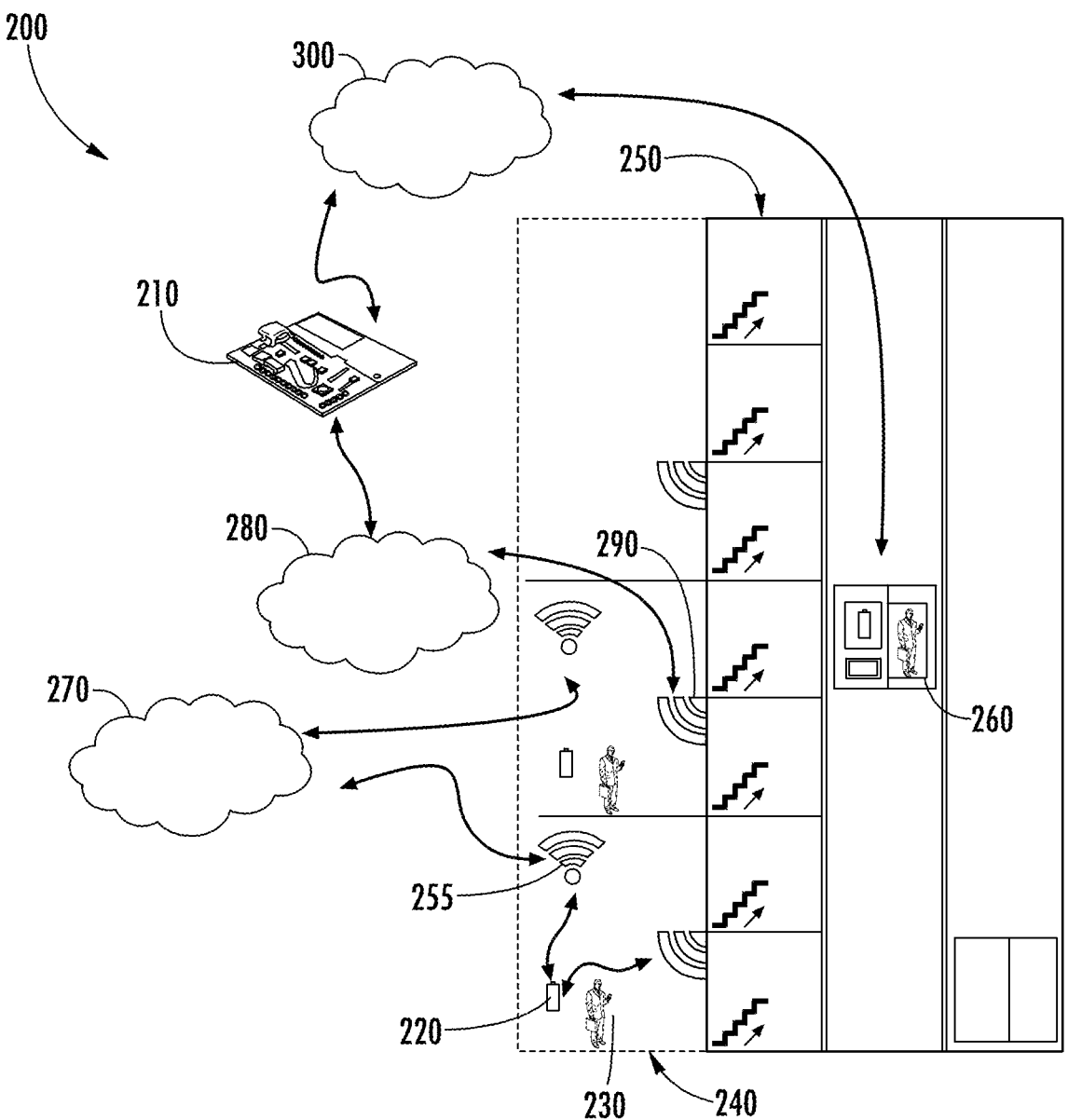
FIG. 2 illustrates additional features associates with one or more disclosed embodiments.
Figure 3:
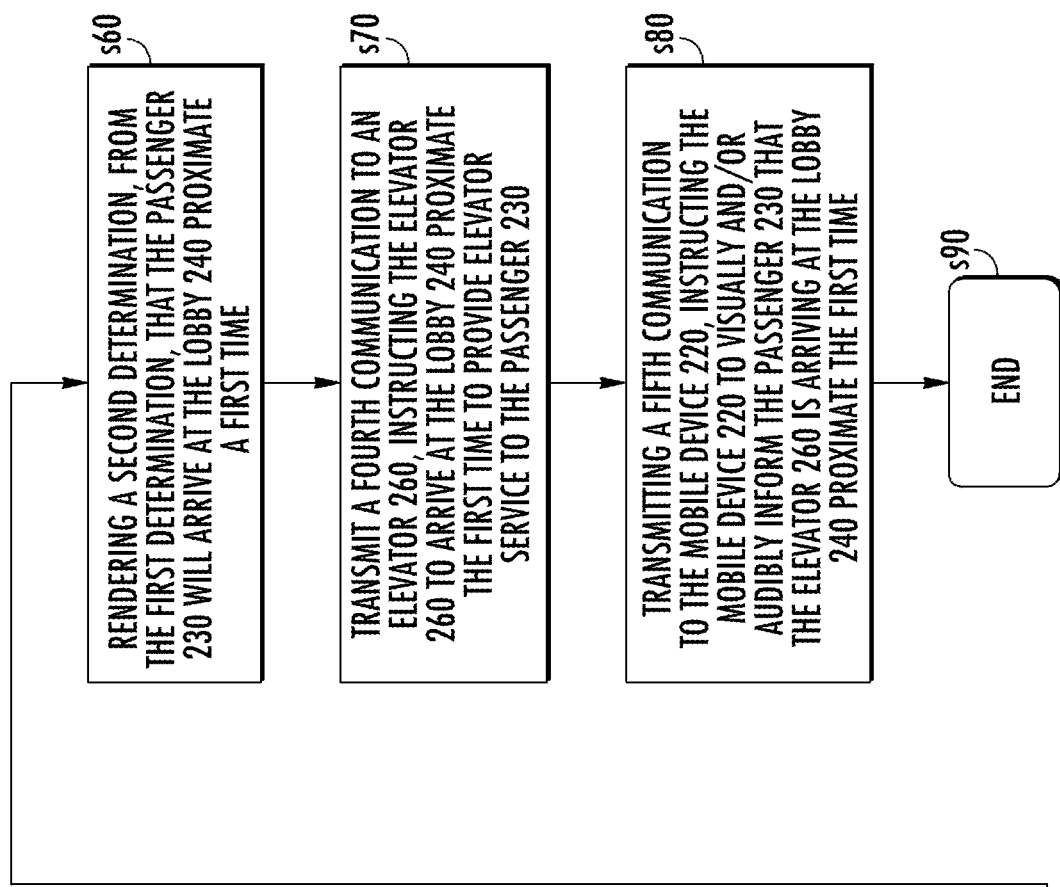
FIG. 3 illustrates a process associated with one or more disclosed embodiments.
Figure 3:
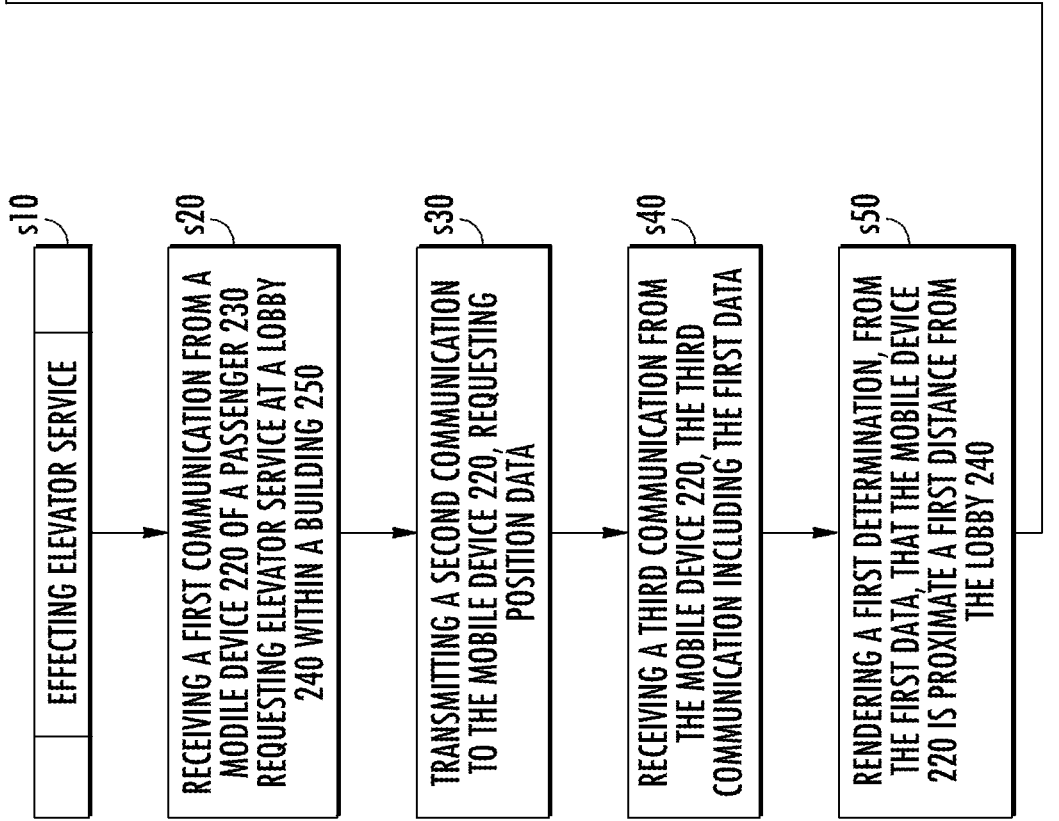

Turning to FIGS. 2 and 3, in one disclosed embodiment an elevator system 200 is provided that includes a controller 210. The controller 210 is configured for executing step S10 of effecting elevator surface. Step S10 may include step S20 of receiving a first communication from a mobile device 220 of a passenger 230. The first communication may request elevator service at a lobby 240 within a building 250.

At step S30 the controller 210 may transmit a second communication to the mobile device 220. The second communication may requesting the mobile device 220 to return first data. The first data may be position data obtained by the mobile device 220. The position data may be obtained by the mobile device 220 executing a multilateration (MLAT) process with one or more proximately located telecommunication devices 255.

At step S40 the controller 210 may receive a third communication from the mobile device 220, the third communication including the first data. At step S50 the controller 210 may render a first determination, from the first data, that the mobile device 220 is proximate a first distance from the lobby 240. For example, the controller 210 may determine the passenger 230 is approximately thirty meters from the lobby 240.

At step S60 the controller 210 may render a second determination, from the first determination, that the passenger 230 will arrive at the lobby 240 proximate a first time. This time is, for example, a time that the passenger 230, walking to the lobby 240, would arrive at the lobby 240. For example, the time may be five minutes from the controller 210 receiving the third communication.

At step S70 the controller 210 may transmit a fourth communication to an elevator 260. The fourth communication may instruct the elevator 260 to arrive at the lobby 240 proximate the first time to provide elevator service to the passenger 230. For example, if the passenger 230 is expected to arrive at the lobby 240 in five minutes, the controller 210 may instruct the elevator 260 to arrive at the lobby 240 a minute before the passenger 230. This may avoid the passenger 230 waiting at the lobby 240 and may potentially optimize use of the elevator 260 because the elevator 260 may avoid unnecessary loitering at the lobby 240.

In one embodiment, the controller 210 is configured for executing step S80 of transmitting a fifth communication to the mobile device 220. The fifth communication may instruct the mobile device 220 to visually and/or audibly inform the passenger 230 that the elevator 260 is arriving at the lobby 240 proximate the first time to provide the first passenger 230 with elevator service. When no further decisions or actions are required under step S10, the controller 210 may execute step S90 of ending the current process.

Figure 4:
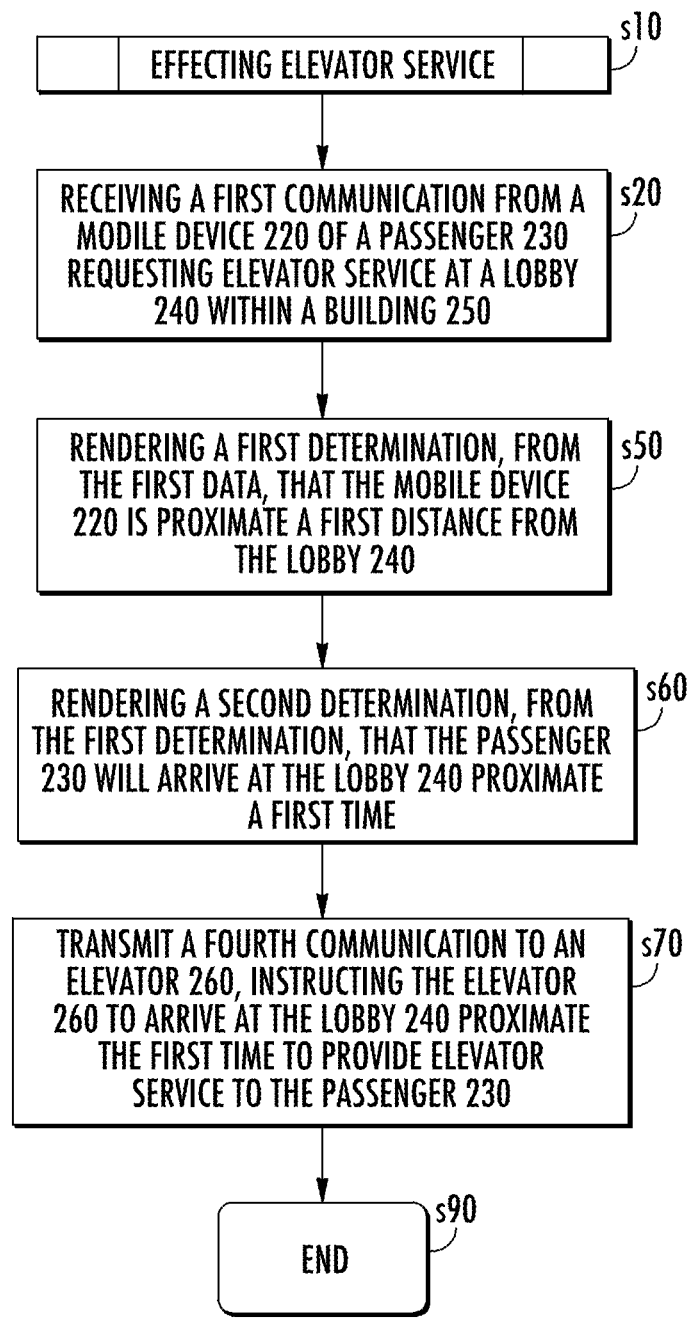
FIG. 4 illustrates an alternative to the process illustrated in FIG. 3 as associated with one or more disclosed embodiments.

In one embodiment of executing step S10 of effecting elevator service, fewer than all of the above disclosed steps may be performed to achieve benefits disclosed herein. For example, as illustrated in FIG. 4, it is within the scope of the disclosure for the controller 210 to perform: step S20 of receiving a communication from the mobile device 220 for a passenger 230, the communication including first data, wherein the first data is position data obtained by the mobile device 220 executing a multilateration (MLAT) process with one or more proximately located telecommunication devices; step S50 of rendering a first determination, from the first data, that the mobile device 220 is proximate a first distance from the lobby 240; step S60 of rendering a second determination, from the first determination, that the passenger 230 will arrive at the lobby 240 proximate a first time; and step S70 of transmitting a communication to an elevator 260, instructing the elevator 260 to arrive at the lobby 240 proximate the first time to provide elevator service. After step S70, in one embodiment the controller 210 may end the process that began with step S10.

In one or more embodiments, the mobile device 220 may execute the MLAT process by executing Wi-Fi RTT (Round-Trip-Time) protocols with the one or more proximately located telecommunication devices. Such protocols are identified in the standard printed by the Institution of Electrical and Electronic Engineers (IEEE 802.11mc). With such protocols, the mobile device 220 may measure the distance to, for example, three or more Wi-Fi access points and apply an MLAT algorithm to estimate the device position. Accuracy of such measurements may be within one or two meters.

In one embodiment, the one or more proximately located telecommunication devices 255 are one or more Wi-Fi access points. In one embodiment, the one or more Wi-Fi access points 255 are at least three Wi-Fi access points (two of such access points 255 are illustrated in FIG. 2). In one embodiment, the at least three Wi-Fi access points 255 are located within the building 250. In one embodiment, the at least three Wi-Fi access points 255 communicate over a common Wi-Fi network 270.

In one embodiment, the controller communicates with the mobile device over a personal area network (PAN) 280. In one embodiment, the elevator system 200 includes at least one beacon 290 for communicating with the mobile over the PAN 280. In one embodiment, the controller 210 communicates with the elevator 260 over a Controller Area Network (CAN) 300.

As disclosed above, the system is capable of determining a passenger's current location by communicating with a mobile device for a passenger, which may be a smart device, using a Wi-Fi round trip time (WIFI RTT) protocol. Such communications may enable locating a passenger within an error tolerance of, for example, a few meters from an actual passenger location relative to the elevator lobby. The system may use this data to effectively place an elevator call. WIFI RTT precools may include for example IEEE 802.11mc. In some embodiments existing hardware may be able to measure user indoor position to an accuracy of a few meters. In some embodiments, the system may obtain distance information from the mobile device rather than calculating the distance to the device from the lobby. A benefit of the embodiments include, for example, effectively placing elevator calls when a passenger is within a building and further within a predetermined range of a lobby.

As used herein, mobile device may be a "smart device" and may contain one or more processors capable of communication using with other such devices by applying wired and/or wireless telecommunication protocols. Non-limiting examples of a smart device include a mobile phone, personal data assistant (PDA), tablet, watch, wearable or other processor-based devices. An application executed by such devices may be identified as an "App", and may be available from an App Store, which is a digital distribution platform for distributing computer software applications over the Internet. Apps contain program level protocols enabling structured and logical communications between devices. Communication protocols applied by smart devices may include cellular, local area network (LAN) protocols and/or a private area network (PAN) protocols. LANs that apply Transport Control Protocol/Internet Protocol (TCP/IP protocol), for example, through a default gateway, may be interconnected over the Internet, and such systems that share computing resources over the Internet may be considered as computing over a Cloud. Locally, LAN protocols may apply Wi-Fi technology for communicating over Wi-Fi access points. Wi-Fi technology is a technology based on the Section 802.11 standards from the Institute of Electrical and Electronics Engineers, or IEEE. Technology applying PAN protocols may communicate over PAN beacons. PAN technology includes, for example, Bluetooth Low Energy (BTLE), which is a wireless technology standard designed and marketed by the Bluetooth Special Interest Group (SIG) for exchanging data over short distances using short-wavelength radio waves. PAN protocols may also include Zigbee, a technology based on Section 802.15.4 protocols from the Institute of Electrical and Electronics Engineers (IEEE). More specifically, Zigbee represents a suite of high-level communication protocols used to create personal area networks with small, low-power digital radios for low-power low-bandwidth needs, and is best suited for small scale projects using wireless connections. Wireless protocols may further include short range communication (SRC) protocols, which may be utilized with radio-frequency identification (RFID) technology. RFID may be used for communicating with an integrated chip (IC) on an RFID smartcard. Wireless protocols may further include long range, low powered wide area network (LoRa and LPWAN) protocols that enable low data rate communications to be made over long distances by sensors and actuators for machine-to-machine (M2M) and Internet of Things (IoT) applications. The controller area network (CAN) may be based on the standards adopted by the International Standards Organization (ISO), such as 11898 (1993 CAN 2.0A), and thereafter extended 11898 (1995 CAN 2.0B), though such examples are not limiting.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An elevator system comprising a controller configured for:

receiving a communication from the mobile device for a passenger, the communication including first data, wherein the first data is position data obtained by the mobile device executing a multilateration (MLAT) process with one or more proximately located telecommunication devices, rendering a first determination, from the first data, that the mobile device is proximate a first distance from a first lobby within a building, rendering a second determination, from the first determination, that the passenger will arrive at the lobby proximate a first time, and transmitting a communication to an elevator instructing the elevator to arrive at the lobby proximate the first time to provide elevator service to the passenger, wherein prior to receiving the communication from the mobile device, the controller is configured for: receiving a communication from the mobile device requesting elevator service at the lobby, and transmitting a communication to the mobile device requesting the mobile device to return the first data, wherein the controller is configured for transmitting a communication to the mobile device, instructing the mobile device to visually and/or audibly inform the passenger that the elevator is arriving at the lobby proximate the first time to provide the first passenger with elevator service.

2. The system of claim 1, wherein the mobile device executes the MLAT process by executing Wi-Fi RTT (Round-Trip-Time) protocols with the one or more proximately located telecommunication devices.

3. The system of claim 2, wherein the one or more proximately located telecommunication devices are one or more Wi-Fi access points.

4. The system of claim 3, wherein the one or more Wi-Fi access points are at least three Wi-Fi access points.

5. The system of claim 4, wherein the at least three Wi-Fi access points are located within the building.

6. The system of claim 5, wherein the at least three Wi-Fi access points communicate over a common Wi-Fi network.

7. The system of claim 6, wherein the controller communicates with the mobile device over a personal area network (PAN) and the controller communicates with the elevator over a Controller Area Network (CAN).

8. The system of claim 7, comprising at least one beacon for communicating with the mobile over the PAN.

9. A method of operating an elevator system with a controller, comprising:

receiving a communication from the mobile device for a passenger, the communication including first data, wherein the first data is position data obtained by the mobile device executing a multilateration (MLAT) process with one or more proximately located telecommunication devices, rendering a first determination, from the first data, that the mobile device is proximate a first distance from a first lobby within a building, rendering a second determination, from the first determination, that the passenger will arrive at the lobby proximate a first time, and transmitting a communication to an elevator, the second communication instructing the elevator to arrive at the lobby proximate the first time to provide elevator service to the passenger, wherein prior to receiving the communication from the mobile device, the controller is configured for: receiving a communication from the mobile device requesting elevator service at the lobby, and transmitting a communication to the mobile device requesting the mobile device to return the first data, wherein the controller is configured for transmitting a communication to the mobile device, instructing the mobile device to visually and/or audibly inform the passenger that the elevator is arriving at the lobby proximate the first time to provide the first passenger with elevator service.

10. The method of claim 9, wherein the mobile device executes the MLAT process by executing Wi-Fi RTT (Round-Trip-Time) protocols with the one or more proximately located telecommunication devices.

11. The method of claim 10, wherein the one or more proximately located telecommunication devices are one or more Wi-Fi access points.

12. The method of claim 11, wherein the one or more Wi-Fi access points are at least three Wi-Fi access points.

13. The method of claim 12, wherein the at least three Wi-Fi access points are located within the building.

14. The method of claim 13, wherein the at least three Wi-Fi access points communicate over a common Wi-Fi network.

15. The method of claim 14, wherein the controller communicates with the mobile device over a personal area network (PAN) and the controller communicates with the elevator over a Controller Area Network (CAN).

16. The method of claim 14, comprising at least one beacon for communicating with the mobile over the PAN.

* * * * *